(12) United States Patent
Seiter et al.

(10) Patent No.: US 7,790,076 B2
(45) Date of Patent: Sep. 7, 2010

(54) FOAM INSULATING LINERS AND METHODS FOR MANUFACTURING THE SAME

(75) Inventors: Joseph A. Seiter, Raleigh, NC (US); Ronald J. Zupancich, Sr., Clayton, NC (US)

(73) Assignee: Martin Marietta Materials, Inc., Raleigh, NC (US)

( * ) Notice: Subject to any disclaimer, the term of this patent is extended or adjusted under 35 U.S.C. 154(b) by 884 days.

(21) Appl. No.: 11/195,519

(22) Filed: Aug. 1, 2005

(65) Prior Publication Data

US 2007/0026220 A1 Feb. 1, 2007

(51) Int. Cl.
*B32B 5/18* (2006.01)
(52) U.S. Cl. .......................... 264/41; 264/45.1; 428/86; 52/406.2
(58) Field of Classification Search .............. 264/45.1, 264/45.3, 46.5, 46.6, 263; 52/406.2
See application file for complete search history.

(56) References Cited

U.S. PATENT DOCUMENTS

| | | | | | |
|---|---|---|---|---|---|
| 3,122,860 | A | * | 3/1964 | Schulze | 52/309.11 |
| 3,859,401 | A | * | 1/1975 | Gallap et al. | 264/45.3 |
| 3,900,650 | A | * | 8/1975 | Sedore | 428/86 |
| 3,998,015 | A | * | 12/1976 | Scott et al. | 52/222 |
| 4,070,848 | A | * | 1/1978 | Lingle | 52/707 |
| 5,087,514 | A | * | 2/1992 | Graefe | 428/315.5 |
| 5,860,693 | A | * | 1/1999 | Ehrlich | 296/191 |
| 5,970,889 | A | * | 10/1999 | Shaffer et al. | 109/65 |
| 7,273,576 | B2 | * | 9/2007 | White | 264/257 |
| 2008/0143157 | A1 | * | 6/2008 | Burch | 297/219.1 |

OTHER PUBLICATIONS

Dan McCormack, Understanding Refrigerated Trailer Insulation Efficiency, Evolving Trailer Technology, vol. 6, Issue 4, www.greatdanetrailers.com, Jun. 28, 2005.

* cited by examiner

*Primary Examiner*—Richard E Chilcot, Jr.
*Assistant Examiner*—Alp Akbasli
(74) *Attorney, Agent, or Firm*—Bachman & LaPointe, P.C.

(57) ABSTRACT

A foam insulating liner includes a liner frame comprising a first side, a second side and a perimeter disposed about an injected foam insulating core. The method of its manufacture includes the steps of placing a first side of an insulating liner frame in a first half of a mold; placing a second side of said insulating liner frame in a second half of said mold; sealing together said first half and said second half of said mold; disposing a quantity of foam material between said first side and said second side of said insulating liner frame within said sealed mold; and removing a foam insulating liner from said mold.

15 Claims, 5 Drawing Sheets

FOAM INSULATING LINERS AND METHODS FOR MANUFACTURING THE SAME

FIELD OF USE

The present application relates to insulating products, and more particularly, to foam insulating products and their methods of manufacture.

BACKGROUND OF THE INVENTION

Foam insulating products are utilized for a variety of applications. Generally, applications requiring insulation materials involve retaining cool air or heat or maintaining a constant temperature. One example is refrigeration technology where refrigeration units generate cool air and insulation materials help slow or prevent heat transfer thus causing the temperature to rise and eventually overwork the refrigeration unit.

One example of refrigeration technology in use is a refrigerated railway car. Such railway cars employ at least insulated door liners. Presently, these insulated door liners are metal doors having a liner attached therein. The liner is typically a poured foam liner, an injected foam liner, or other type of foam material, such that a quantity of foam material was either poured or injected directly upon one side of the steel door and allowed to set and expand. Although such insulated door liners achieve some degree of insulation, that is, prevent heat transfer and maintain cool temperatures, their construction is not durable and wear quickly.

Consequently, there exists a need for an improved insulating liner having a more durable construction and, in turn, improved insulating properties than present insulating liners.

SUMMARY OF THE INVENTION

In accordance with the present invention, a method for manufacturing foam insulating liners broadly comprises placing a first side of an insulating liner frame in a first half of a mold; placing a second side of the insulating liner frame in a second half of the mold; sealing together the first half and the second half of the mold; disposing a quantity of foam material between the first side and the second side of the insulating liner frame within the sealed mold; and removing a foam insulating liner from the mold.

In accordance with the present invention, a foam insulating liner broadly comprises a liner frame comprising a first side, a second side and a perimeter disposed about an injected foam insulating core The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

The foam insulating liners described herein provide improved durability and heat transfer characteristics owing to its solid construction and can be manufactured at lower costs. The foam insulating liners may comprise a pre-fabricated insulating core encapsulated by a resin shell or an insulating core encapsulated by a pre-fabricated resin shell.

In a first embodiment of the door liner described herein, the pre-fabricated insulating core may comprise a foam insulating core encapsulated in a reinforced polymer resin shell. The shell may have a coated exterior to provide aesthetic value or utilitarian benefits. A method for manufacturing the first embodiment may comprise forming the insulating core, disposing the insulating core in a mold lined with a reinforcing material, disposing a resin material into the mold and wetting the reinforcing material, and curing the reinforced resin to form the foam insulating liner. In a second embodiment of the door liner described herein, a foam insulating core may be encapsulated by a pre-fabricated resin shell. A method for manufacturing the second embodiment may comprise manufacturing a pre-fabricated resin shell using one or more resin materials including one or more reinforcing materials and additives, along with catalysts and/or curing agents to cure the resin material. The pre-fabricated resin shell may comprise two halves that mate together. One half is disposed within a mold lined in its entirety with a non-adhesive agent to permit its removal. The second half is mated to the first half within the mold, and the mold is sealed. A quantity of foam material may then be disposed with the mold and between the two halves to form the insulating core.

Figure 1:
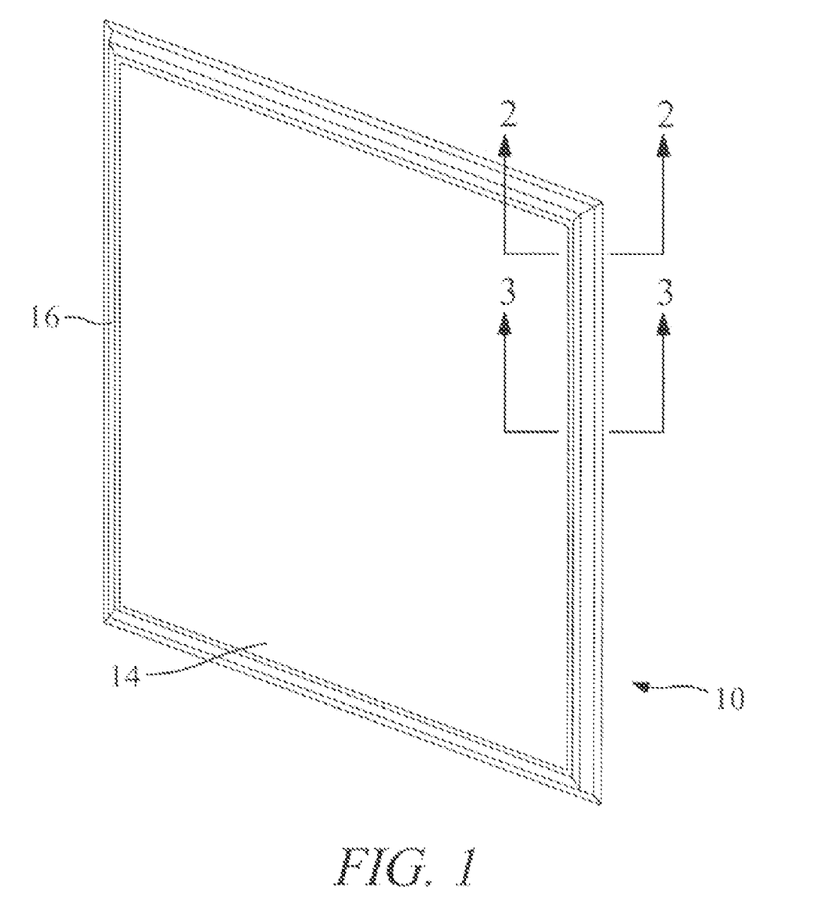
FIG. 1 is a representation of a foam insulated door liner of the present invention.
Figure 2:
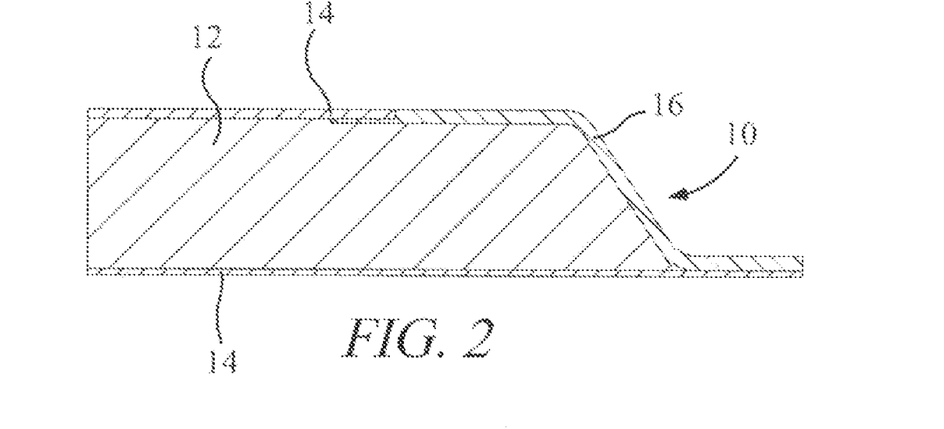
FIG. 2 is a plan view of a cross-section of the door liner of FIG. 1.
Figure 3:
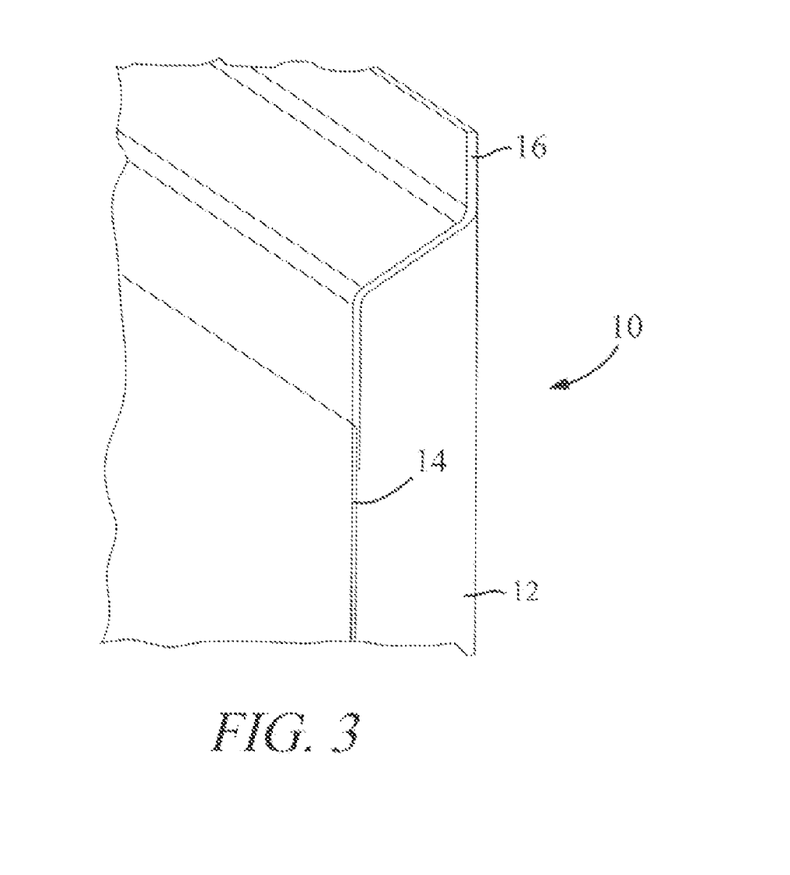
FIG. 3 is a perspective view of another cross-section of the door liner of FIG. 1.

In a first embodiment of a foam insulating liner and its method of manufacture described herein, a foam insulating liner 10 made in accordance with the present invention is depicted in FIGS. 1-3. Foam insulating liner 10 may comprise an insulating core 12 encapsulated by a resin shell 14 and framed by a closeout material 16 along its perimeter. Insulating core 12 may comprise a pre-fabricated foam insulating core comprised of a foam material. As understood by one of ordinary skill in the art, the type of foam employed determines the method of manufacture of insulating core 12. In turn, various methods may be utilized to form insulating core 12 including but not limited to molding, machining, extrusion, pultrusion and combinations comprising at least one of the foregoing methods. When manufacturing insulating core 12 using a molding process, a quantity of non-adhering material such as but not limited to lubricant(s), plastic sheeting and/or Teflon® tape may be employed to prevent the fabricated insulating core from sticking to the mold's interior surface. In turn, such non-adhering material prevents surface blemishes or pock marks which may affect detrimentally the heat transfer properties of the insulating core. Any suitable molding apparatus known in the art may be employed. Preferably, a foam press is utilized to construct foam insulating core 12.

The foam material may include but is not limited to froth foam, pour foam, boardstock foam, bunstock foam, vacuum foam panels and the like. Preferred vacuum foam panels are Instill® commercially available from Dow Chemical® of Midland, Mich.; Threshold® commercially available from Thermal Visions of Granville, Ohio. Preferred froth foam is commercially available from FSI of Lewisville, Tex.; and Polycell® commercially available from Imperial Chemical Industries, PLC of London, United Kingdom. In addition, insulating core 12 may also comprise a foam material including but not limited to cellular elastomeric foam, cellular glass foam, cellular polystyrene, cellular polyurethane, cellulosic fiber, aldehyde condensed phenols, polyethylene, polyisocyanurate, polyolefin, polyvinyl chloride, polyvinyl fluoride, polyvinyl, vinyl and the like, and combinations comprising at least one of the foregoing foam materials.

Insulating core 12 is preferably encapsulated by resin shell 14. Resin shell 14 may comprise a resin material, one or more reinforcing materials and one or more additives. During the manufacture of the insulating liner, the resin material includes at least one catalyst and/or curing agent to promote the cure of the resin material as is understood by one of ordinary skill in the art in order to form resin shell 14.

The amount of curing agent employed depends upon the ambient temperature conditions, the operating temperatures of the production line and within the facility housing the line. Generally, the ambient temperature of the facility housing the equipment, including the production line itself, may be maintained in a range of about 60° F. to 110° F., and preferably at least 60° F. Although, such temperature conditions are subject to change dependent upon the weather conditions. For example, a summer resin mixture may be employed when the weather is warm, hot and/or humid and temperatures far exceed 60° F. and are closer to 110° F. These high outdoor temperatures may influence the temperature within the facility and production line, which may facilitate the need for a summer resin mixture. At such high temperatures, the curing reaction of the resin material accelerates. In order to regulate and control the curing reaction, the amount of curing agent may be reduced to prevent a premature cure or hardening of the resin during production. Likewise, when weather conditions are near or below 60° F., a winter resin mixture may be employed. At such low temperatures, the curing reaction of the resin material decelerates and an additional amount of curing agent is required to facilitate the curing reaction.

The resin material may include but is not limited to urethanes, polystyrenes, polyesters, epoxies and the like, and combinations comprising at least one of the foregoing resin materials. The reinforcing materials may include but are not limited to ceramic fibers, fibrous glass, glass cloth, glass fabric, glass fiber, calcium silicate, diatomaceous earth, expanded vermiculite, cellulose fibers, woven fabric, non-woven fabric, compacted powder, compacted fiber, mineral fiber, mineral wool, perlite, refractory materials, wood fibers, poly-paraphenylene terephthalamide fibers and the like, and combinations comprising at least one of the foregoing reinforcing materials. The additives may include but are not limited to abrasion resistant materials, sweat resistant materials, chemical resistant materials, blackbody materials, fire resistant materials, fire retardant materials, intumescent materials, water vapor retardant materials, mold resistant materials, mildew resistant materials, solvent resistant materials, caustic resistant materials, freeze-thaw resistant materials, water resistant materials and the like, and combinations comprising at least one of the foregoing additives.

Optionally, resin shell 14 may further comprise a coating applied to its exterior surface which may blend with the appearance of shell 14 or be absorbed into shell 14. Moreover, the coating may either be aesthetic in nature or serve a practical, utilitarian purpose. For example, the coating may include but is not limited to anti-abrasive, appearance coverings, blackbody coatings, breather coatings, mastic coatings, moisture barrier coatings, weather barrier coatings and the like, and combinations comprising at least one of the foregoing coatings. In addition, resin shell 14 may further comprise an exterior feature(s) or particular shape in accordance with the intended application of insulating liner 10, which will be described in further detail.

A method for manufacturing foam insulating liner 10 described herein may include first forming insulating core 12 as described in detail above. Typically, insulating core 12 may take about 40 minutes to 60 minutes to form given the method of manufacture selected and the foam material employed. Throughout the fabrication process of foam insulating liner 10, the ambient temperature of the facility housing the equipment, including the production line itself, may be maintained in a range of about 60° F. to 110° F., and preferably at least 60° F. Once insulating core 12 is fabricated, insulating core 12 may then be disposed in a mold (not shown), for example, a foam press, having a design embodying the intended product. For purposes of illustration and not to be taken in a limiting sense, the mold described herein embodies a door such that the foam insulating liner produced resembles a door insulating liner. The mold may be lined with a quantity of one or more reinforcing materials and/or one or more additives as described above prior to disposing insulating core 12. A second quantity of one or more reinforcing materials and/or one or more additives may be disposed upon either insulating core 12, the second half of the mold being disposed upon insulating core 12, or both prior to sealing the mold.

The mold is then bagged or enclosed using any one of a number of methods as understood by one of ordinary skill in the art. Other representative and suitable methods include open molding processes such as, but not limited to, chopped strand mat, hand lay up, combinations comprising at least one of the foregoing methods, and the like, and closed molding processes such as, but not limited to, resin injected molding (RIM), resin transfer molding (RTM), compression molding using sheet molding compounds and bulk molding compounds, infusion molding such as seeman composites resin infusion under flexible tooling (SCRIMP), vacuum assisted resin transfer molding (VARTM) and channel assisted resin transfer molding (CARTM), reinforced reaction injection molding, structural reaction injection molding, combinations comprising at least one of the foregoing methods, and the like. A quantity of resin material as described above is then disposed within the mold and around insulating core 12. The resin material may be disposed within the bagged mold using any number of methods known to one of ordinary skill in the art and as described above such that the resin material fills the entirety of the void surrounding insulating core 12 and wets all of the reinforcing materials contained therein. Preferably, the resin material is vacuum infused into the bagged mold such that the entirety of the void surrounding insulating core 12 is filled and all of the reinforcing materials and additives are wetted. As is understood by one of ordinary skill in the art, a certain amount of time is required to allow the resin material to cure and harden in order to form resin shell 14. The amount of time required may be dependent upon, for example, the resin material(s), curing agent(s), catalyst(s), other materials, operating conditions and/or environmental conditions mentioned earlier. Generally, resin shell 14 may take about 40 minutes to 60 minutes to form dependent upon the resin material employed and amount of catalysts and/or curing agents present in the mixture.

Once resin shell 14 is cured, the mold may be debagged and cracked open to remove the foam insulating liner. Foam insulating liner 10 may then be manufactured further to meet customer specifications for its intended use. For example, foam insulating liner 10 may be utilized as a foam insulated door liner. To achieve this purpose foam insulating liner 10 may be cut or machined to specific dimensions and then framed with any number of materials. For purposes of illustration and not to be taken in a limiting sense, foam insulating liner 10 may be framed with a closeout material such as a pultruded plastic which is sealingly fitted about the perimeter of liner 10. In addition, foam insulating liner 10 may also be coated with one or more coatings described above in order to enhance its appearance (e.g., an aesthetic covering), its durability (e.g., moisture barrier) and the like.

Figure 4:
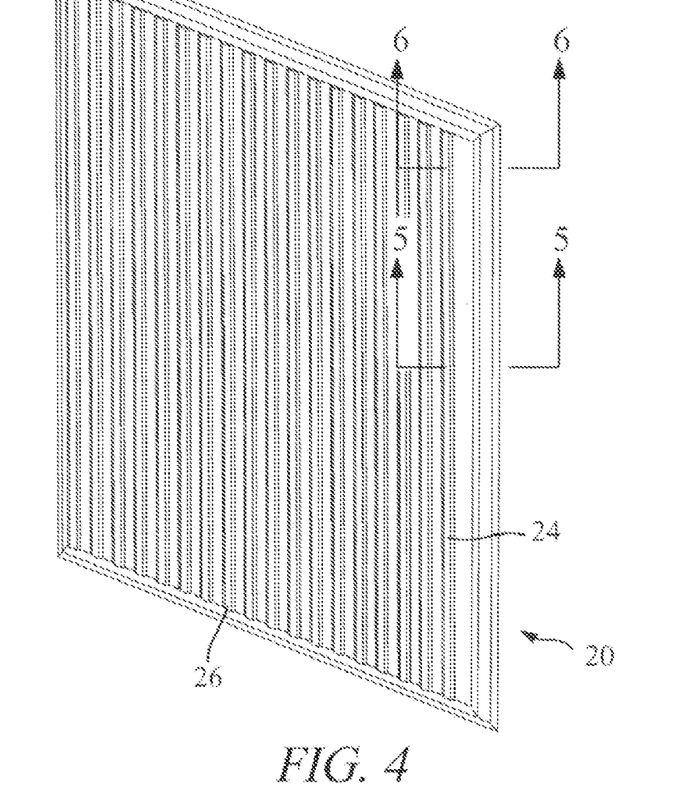
FIG. 4 is a representation of a corrugated, foam insulated door liner of the present invention.
Figure 5:
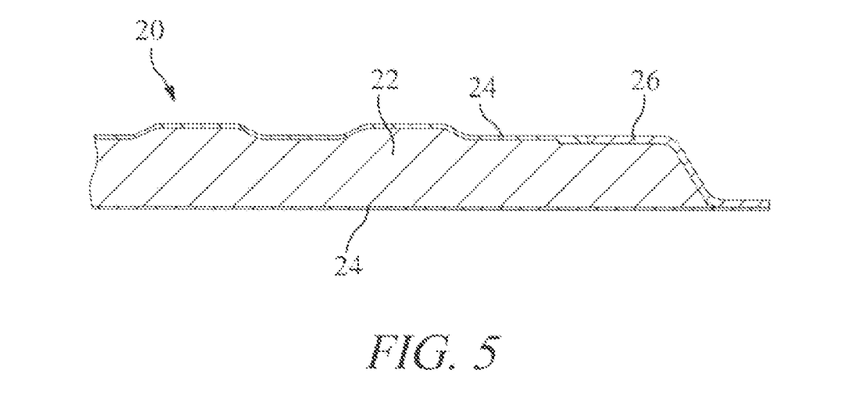
FIG. 5 is a plan view of a cross-section of the door liner of FIG. 4.
Figure 6:
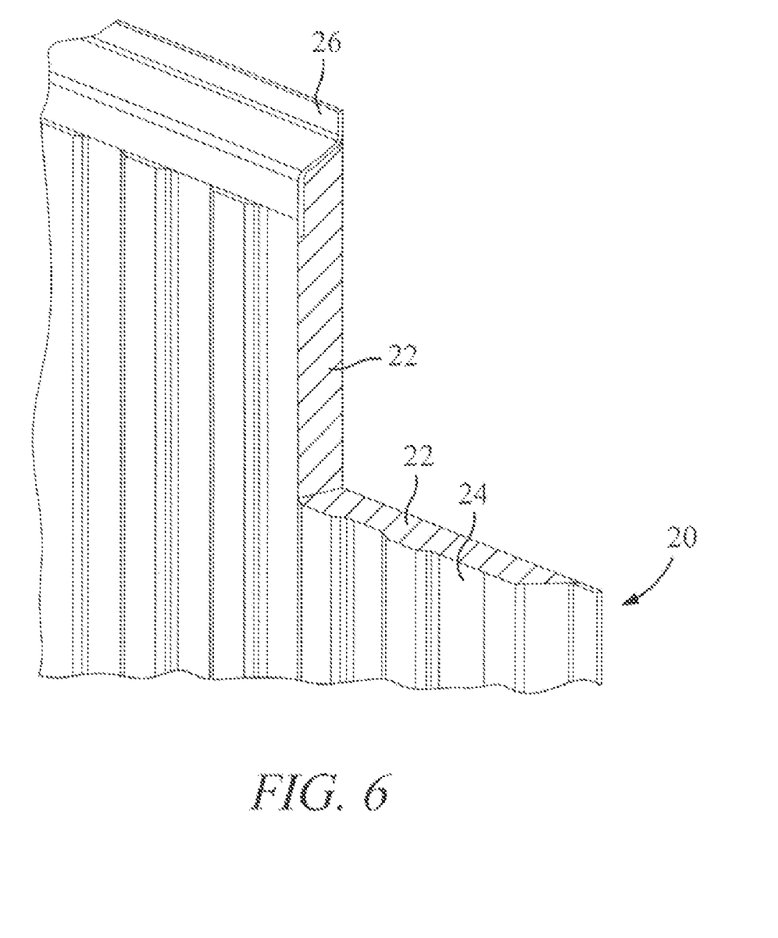
FIG. 6 is an exploded view of the corrugation of the corrugated door liner of FIG. 4.

As mentioned earlier, foam insulated liner 10 may be sized and shaped accordingly to meet customer specifications and its intended application. For example, foam insulating liner 10 may comprise a single piece sized and shaped according to customer specifications. In the alternative, foam insulating liner 10 may be cut into pieces such the pieces may be assembled by the customer for his/her intended application. The foam insulated liner pieces may be assembled using any one or a combination of mechanical fasteners including but not limited to dowels, brackets, staples, screws, bolts, nails, rivets, adhesives, sealants, combinations comprising at least one of the foregoing, and the like, as well as bonding agents known to one of ordinary skill in the art. With respect to an intended application, insulated liner 10 may be, for example, a corrugated insulated liner 20 as depicted in FIGS. 4-6. Such a corrugated insulated liner may be employed in applications where air is required to flow continuously along, for example, the length of a wall. In the alternative, the insulated liner may be flat, and have no exterior features such as, but not limited to, corrugation. Furthermore, the insulated liner may include exterior features complementary to structural features such as tubes and structural actuators so that in some areas an additional amount of insulation, e.g., about 2 to 4 inches, may be achieved. For purposes of illustration and not to be taken in a limiting sense, corrugated insulated liner 20 may be utilized in a refrigerated environment, such as a refrigerated railroad car. The corrugated insulated liner 20 may be mounted to the interior of the railroad car, that is, the door and walls. In such an application, a ceiling mounted refrigeration unit generates cool air and disperses the cool throughout a false ceiling space of the railcar. The cool air flows through the ceiling space and downward through the voids formed between the wall and corrugated insulating liner 20. It is also contemplated that the door and/or walls of the railcar may be set at an angle, such as a slope, which could potentially create larger voids using either a corrugated or flat insulated liner.

Referring now to FIGS. 4-6, an alternative embodiment of the foam insulating liner is represented. As illustrated in these figures, a foam insulating liner 20 may comprise an insulating core 22 encapsulated by a pre-fabricated resin shell 24 and framed by a closeout material 26 disposed along its perimeter.

In the alternative, a film cover may be utilized rather than pre-fabricated resin shell 24. The film cover may be utilized as a backing, reinforcement, cover for aesthetic purposes or a specific utility, and the like. The film cover may comprise any type of clear, colored, textured and the like, material such as polyvinyl, polyethylene, polyvinyl chloride and the like. The film cover may comprise any thickness to meet the intended operating or customer specifications. For example, in one embodiment, the film cover may comprise an about four mil thick layer of polyvinyl chloride. When employing the film cover, the reinforcement materials and/or additives disposed within resin shell 24 are optional, and the mixture of resin material, reinforcing agents and curing agents is not utilized.

A coating for aesthetic or utilitarian purposes as described earlier may be applied to the film cover and the entirety of foam insulating liner 20.

In this embodiment, pre-fabricated resin shell 24 may comprise two halves, that is, a first half and a second half. Resin shell 24 may comprise any one or more of the resin materials already described herein, along with any one or more of the reinforcing materials and/or additives previously described herein. Likewise, when manufacturing pre-fabricated resin shell 24, a catalyst(s) and/or a curing agent is included to promote the cure of the resin material to form resin shell 24. Generally, resin shell 24 may take about 40 minutes to 60 minutes to form dependent upon the resin material employed and amount of catalysts and/or curing agents present in the mixture. Resin shell 24 may be manufactured using any number of methods known to one of ordinary skill in the art such as but not limited to molding, machining, extrusion, pultrusion and the like, and combinations comprising any one of the foregoing methods. During any one of these methods, the corrugations are preferably imparted upon resin shell 24 at this point in the fabrication process. Throughout the fabrication process of foam insulating liner 20, the ambient temperature of the facility housing the equipment, including the production line itself, may be maintained in a range of about 60° F. to 110° F., and preferably at least 60° F.

A first half of resin shell 24 may be disposed within a mold, for example, a foam press, or a first half of a mold or foam press. Prior to either halves of resin shell 24 into the mold, a quantity of non-adhering material sufficient to prevent the resin material, and other ingredients, from sticking to the mold's interior surface is applied to the mold. Once the first half is positioned within the mold, the second half of resin shell 24 may be disposed into the second half of the mold. The two halves of the mold, for example, foam press, may then be sealed together and a quantity of foam material, as previously described herein, may be disposed into the void between the first and second halves of resin shell 24. Preferably, the foam material fills the entirety of the void to form insulating core 22. The foam material may be disposed using any number of methods described herein, and known to one of ordinary skill in the art, and is preferably injected between the two halves of resin shell 24. Generally, the injection process is performed using dispensing equipment such as the machines and guns commercially available from Graco Gusmer of Minneapolis, Minn. After injection, the foam material develops a pressure of about 1 to 10 pounds per square inch [absolute], and preferably 3 to 7 pounds per square inch [absolute] within resin shell 24. Depending upon the foam materials utilized and properties of resin shell 24, a certain amount of time may be required prior in order for the foam material to set and harden to form insulating core 22. Generally, foam insulating core 22 may take about 40 minutes to 60 minutes to form dependent upon the foam material employed. Once insulating core 22 is set, resultant foam insulating liner may be removed from the mold.

The resultant insulating liner may then be manufactured further to meet customer specifications for its intended use. For example, foam insulating liner 20 may be utilized in a railcar as described above in the illustrative, non-limiting example. Irrespective of the intended end use, foam insulating liner 20 may be cut or machined, or otherwise, to specific dimensions and then may be framed with any number of materials. For purposes of illustration and not to be taken in a limiting sense, foam insulating liner 20 may be framed with a closeout material such as a pultruded plastic which is sealingly fitted about the perimeter of liner 20. In addition, foam insulating liner 20 may also be coated with one or more coatings as described beforehand in order to enhance its appearance (e.g., an aesthetic covering), its durability (e.g., breather coatings), and the like.

In the alternative, when utilizing a film cover rather than a resin shell, the film cover material having a thickness of about 5 mils to 10 mils may be placed in both a first half and a second half of a mold. Prior to placing the film cover into both halves of the mold, e.g., a foam press, a quantity of the non-adhering material sufficient to prevent the film cover from sticking to the mold's interior surfaces is applied to the mold. The mold may then be sealed and a quantity of foam material, as previously described herein, may be disposed into the void between the two pieces of film cover within the mold. Preferably, the foam material fills the entirety of the void to form insulating core 22. The foam material may be disposed using any number of methods described herein, and known to one of ordinary skill in the art, and is preferably injected between the two pieces of film cover. Generally, the injection process is performed using dispensing equipment such as the machines and guns commercially available from Graco Gusmer of Minneapolis, Minn. After the foam material develops a pressure of about 1 to 10 pounds per square inch [absolute], and preferably 3 to 7 pounds per square inch [absolute] within the two pieces of film cover. Depending upon the foam materials utilized, a certain amount of time may be required prior in order for the foam material to set and harden to form insulating core 22. Generally, foam insulating core 22 may take about 40 minutes to 60 minutes to form dependent upon the foam material employed. Once insulating core 22 is set, resultant film cover encapsulated foam insulating liner may be removed from the mold.

Figure 7:
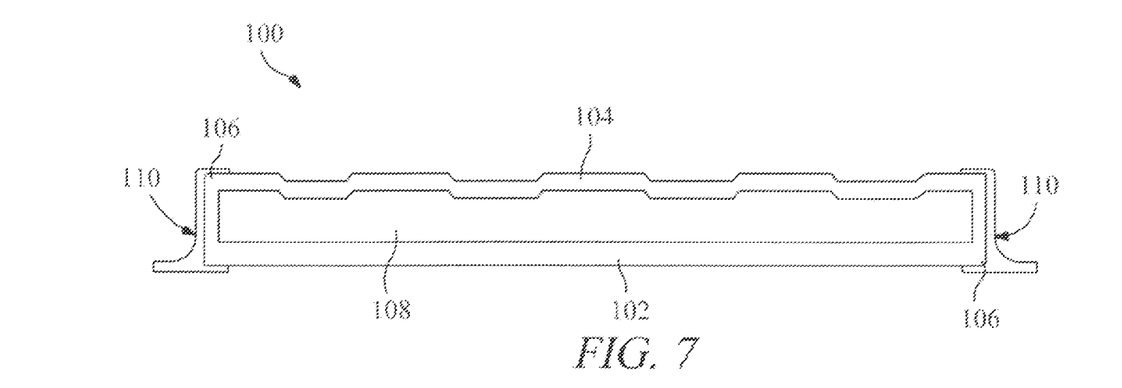
FIG. 7 is a cross-sectional view of another embodiment of the foam insulating liner of the present invention.

Referring now to FIG. 7, another embodiment of a foam insulating liner made in accordance with the present invention is depicted. A foam insulating liner 100 may comprise a liner frame having a first side 102, a second side 104 and a perimeter 106 disposed about an insulating core 108. Optionally, foam insulating liner 100 may be framed by a closeout material 110 along perimeter 106. Insulating core 108 may comprise an injected foam insulating core comprised of a foam material. Again, as understood by one of ordinary skill in the art, the type of foam employed determines the method of manufacture of insulating core 108. In a preferred embodiment, insulating core 108 is formed by injecting a quantity of foam material between first 102 and second side 104 of the liner frame as will be described in greater detail below.

The foam material may comprise any injectable foam material known to one of ordinary skill in the art. For example, the foam material may include but is not limited to cellular elastomeric foam, cellular glass foam, cellular polystyrene, cellular polyurethane, cellulosic fiber, aldehyde condensed phenols, polyethylene, polyisocyanurate, polyolefin, polyvinyl chloride, polyvinyl fluoride, polyvinyl, vinyl and combinations comprising at least one of the foregoing foam materials. In addition, the foam material may also comprise a froth foam.

Insulating core 108 is preferably contained within a pre-fabricated liner frame comprising a resin material. Both first side 102 and second side 104 may comprise a resin material, one or more reinforcing materials and one or more additives.

The resin material may include but is not limited to urethanes, polystyrenes, polyesters, epoxies and combinations thereof. The reinforcing materials may include but are not limited to ceramic fibers, fibrous glass, glass cloth, glass fabric, glass fiber, calcium silicate, diatomaceous earth, expanded vermiculite, cellulose fibers, woven fabric, non-woven fabric, compacted powder, compacted fiber, mineral fiber, mineral wool, perlite, refractory materials, wood fibers, poly-paraphenylene terephthalamide fibers, and combinations thereof. The additives may include but are not limited to abrasion resistant materials, sweat resistant materials, chemical resistant materials, blackbody materials, fire resistant materials, fire retardant materials, intumescent materials, water vapor retardant materials, mold resistant materials, mildew resistant materials, solvent resistant materials, caustic resistant materials, freeze-thaw resistant materials, water resistant materials and combinations thereof.

Optionally, the liner frame may also include a coating applied to its exterior surface which may blend with the appearance of the frame or be absorbed into the frame. Moreover, the coating may either be aesthetic in nature or serve a practical, utilitarian purpose. For example, the coating may include but is not limited to anti-abrasive, appearance coverings, blackbody coatings, breather coatings, mastic coatings, moisture barrier coatings, weather barrier coatings and the like, and combinations comprising at least one of the foregoing coatings.

During the manufacture of the pre-fabricated liner frame, the resin material includes one or more catalysts and/or curing agents to promote the cure of the resin material as is understood by one of ordinary skill in the art in order to form the liner frame. In the alternative, another material such as a film cover material as described earlier may be employed such that either both first side 102 and second side 104, or either first side 102 or second side 104, comprise film cover material rather than resin material. The film cover materials may include but is not limited to polyvinyl, polyvinyl ethylene, polyvinyl chloride, Teflon® (polytetrafluoroethylene) and combinations comprising at least one of the foregoing film cover materials.

Generally, the pre-fabricated liner frame may take about 40 minutes to 60 minutes to form depending upon the resin material employed and amount of catalysts and/or curing agents present in the mixture. The liner frame may be manufactured using any number of methods known to one of ordinary skill in the art such as but not limited to molding, machining, extrusion, pultrusion and the like, and combinations comprising any one of the foregoing methods. For example, first side 102 may comprise a film cover material while second side 104 may comprise a molded resin material. During any one of these methods, a surface feature 112 may be imparted, for example, one or more corrugations or a corrugated pattern, while manufacturing the pre-fabricated liner frame. In the alternative, the pre-fabricated liner frame may be flat and not include any exterior surface features. Throughout the fabrication process of foam insulating liner 100, the ambient temperature of the facility housing the equipment, including the production line itself, may be maintained in a range of about 60° F. to 110° F., and preferably at least 60° F.

A method for manufacturing foam insulating liner 100 described herein may include first forming an insulating liner frame comprising first side 100, second side 102 and optionally a closeout material 110 as a frame disposed about perimeter 106. A first side 100 of the insulating liner frame may be disposed within a mold, or a first half of a mold. Prior to either halves of the insulating liner frame into the mold, a quantity of non-adhering material sufficient to prevent the resin material, and other ingredients, from sticking to the mold's interior surface may be applied to the mold. Once the first half is positioned within the mold, the second side 102 of the insulating liner frame may be disposed within the second half of the mold. The two halves of the mold may then be sealed together and a quantity of foam material, as previously described herein, may be disposed into the void between first side 102 and second side 104 of the insulating liner frame. Preferably, the foam material fills the entirety of the void to form insulating core 108. The foam material may be disposed using any number of methods described herein, and known to one of ordinary skill in the art, and is preferably injected between first side 102 and second side 104.

Generally, the injection process is performed using dispensing equipment such as the machines and guns commercially available from Graco Gusmer of Minneapolis, Minn. After injection, the foam material develops a pressure of about 1 to 10 pounds per square inch [absolute], and preferably 3 to 7 pounds per square inch [absolute] within the insulating liner frame. Depending upon the foam materials utilized and properties of the insulating liner frame, a certain amount of time may be required prior in order for the foam material to set and harden to form insulating core 108. Generally, foam insulating core 108 may take about 40 minutes to 60 minutes to form dependent upon the foam material employed. Once insulating core 108 is set, resultant foam insulating liner may be removed from the mold.

The resultant insulating liner may then be manufactured further to meet customer specifications for its intended use. For example, foam insulating liner 100 may be utilized in a railcar as described above in the illustrative, non-limiting example. Irrespective of the intended end use, foam insulating liner 100 may be cut or machined, or otherwise, to specific dimensions and then may be framed with any number of materials. For purposes of illustration and not to be taken in a limiting sense, foam insulating liner 100 may be framed with a closeout material such as a pultruded plastic which is sealingly fitted about the perimeter. In addition, foam insulating liner 100 may also be coated with one or more coatings as described beforehand in order to enhance its appearance (e.g., an aesthetic covering), its durability (e.g., breather coatings), and the like. Lastly, foam insulating liner 100 may be pre-assembled and shipped to the customer, or dimensioned and shipped to the customer in pieces. In either form, two or more pieces of foam insulating liner 100 may be assembled using any one or a combination of mechanical fasteners including but not limited to dowels, brackets, staples, screws, bolts, nails, rivets, adhesives, sealants, combinations comprising at least one of the foregoing, and the like, as well as bonding agents known to one of ordinary skill in the art.

Figure 8:
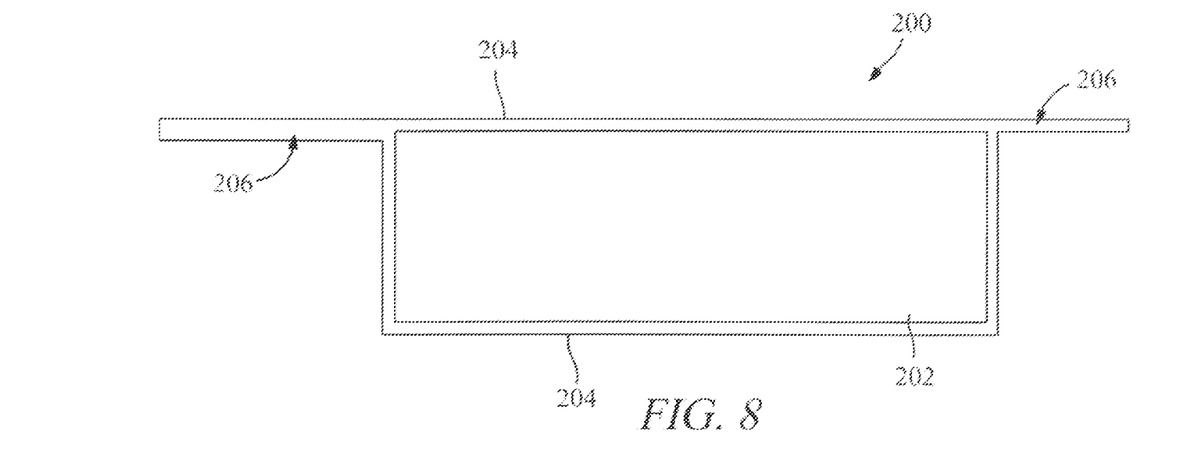
FIG. 8 is a cross-sectional view of yet another embodiment of the foam insulating liner of the present invention.

Referring now to FIG. 8, another embodiment of a foam insulating liner made in accordance with the present invention is depicted. A foam insulating liner 200 may comprise a resin shell 204 enveloping an insulating core 202. Resin shell 204 may include a surface extending beyond enveloped insulating core 202 that forms a leading edge 206 disposed about a portion of enveloped insulating core 202. Preferably, leading edge 206 completely surrounds enveloped insulating core 202.

Insulating core 202 may comprise a pre-fabricated foam insulating core comprised of a foam material. As understood by one of ordinary skill in the art, the type of foam employed determines the method of manufacture of insulating core 202. In turn, various methods may be utilized to form insulating core 202 including but not limited to molding, machining, extrusion, pultrusion and combinations comprising at least one of the foregoing methods. When manufacturing insulating core 202 using a molding process, a quantity of non-adhering material such as but not limited to lubricant(s), plastic sheeting and/or Teflon® (polytetrafluoroethylene) tape may be employed to prevent the fabricated insulating core from sticking to the mold's interior surface. In turn, such non-adhering material prevents surface blemishes or pock marks which may affect detrimentally the heat transfer properties of the insulating core.

The foam material may include but is not limited to froth foam, pour foam, boardstock foam, bunstock foam, vacuum foam panels and the like, as described. In addition, insulating core 202 may also comprise a foam material including but not limited to cellular elastomeric foam, cellular glass foam, cellular polystyrene, cellular polyurethane, cellulosic fiber, aldehyde condensed phenols, polyethylene, polyisocyanurate, polyolefin, polyvinyl chloride, polyvinyl fluoride, polyvinyl, vinyl and the like, and combinations comprising at least one of the foregoing foam materials.

Insulating core 202 is preferably enveloped by resin shell 204. Resin shell 204 may comprise a resin material, one or more reinforcing materials and one or more additives. During the manufacture of the insulating liner, the resin material includes at least one catalyst and/or curing agent to promote the cure of the resin material as is understood by one of ordinary skill in the art in order to form resin shell 204.

The amount of curing agent employed depends upon the ambient temperature conditions, the operating temperatures of the production line and within the facility housing the line. Generally, the ambient temperature of the facility housing the equipment, including the production line itself, may be maintained in a range of about 60° F. to 110° F., and preferably at least 60° F. Although, such temperature conditions are subject to change dependent upon the weather conditions. For example, a summer resin mixture may be employed when the weather is warm, hot and/or humid and temperatures far exceed 60° F. and are closer to 110° F. These high outdoor temperatures may influence the temperature within the facility and production line, which may facilitate the need for a summer resin mixture. At such high temperatures, the curing reaction of the resin material accelerates. In order to regulate and control the curing reaction, the amount of curing agent may be reduced to prevent a premature cure or hardening of the resin during production. Likewise, when weather conditions are near or below 60° F., a winter resin mixture may be employed. At such low temperatures, the curing reaction of the resin material decelerates and an additional amount of curing agent is required to facilitate the curing reaction.

The resin material may include but is not limited to urethanes, polystyrenes, polyesters, epoxies and the like, and combinations comprising at least one of the foregoing resin materials. The reinforcing materials may include but are not limited to ceramic fibers, fibrous glass, glass cloth, glass fabric, glass fiber, calcium silicate, diatomaceous earth, expanded vermiculite, cellulose fibers, woven fabric, non-woven fabric, compacted powder, compacted fiber, mineral fiber, mineral wool, perlite, refractory materials, wood fibers, poly-paraphenylene terephthalamide fibers and the like, and combinations comprising at least one of the foregoing reinforcing materials. The additives may include but are not limited to abrasion resistant materials, sweat resistant materials, chemical resistant materials, blackbody materials, fire resistant materials, fire retardant materials, intumescent materials, water vapor retardant materials, mold resistant materials, mildew resistant materials, solvent resistant materials, caustic resistant materials, freeze-thaw resistant materials, water resistant materials and the like, and combinations comprising at least one of the foregoing additives.

Optionally, resin shell 204 may further comprise a coating applied to its exterior surface which may blend with the appearance of shell 204 or be absorbed into shell 204. Moreover, the coating may either be aesthetic in nature or serve a practical, utilitarian purpose. For example, the coating may include but is not limited to anti-abrasive, appearance coverings, blackbody coatings, breather coatings, mastic coatings, moisture barrier coatings, weather barrier coatings and the like, and combinations comprising at least one of the foregoing coatings. In addition, resin shell 204 may further comprise an exterior feature(s) or particular shape in accordance with the intended application of foam insulating liner 200, which will be described in further detail.

A method for manufacturing foam insulating liner 200 may comprise first forming insulating core 202. Typically, insulating core 202 may take about 40 minutes to 60 minutes to form given the method of manufacture selected and the foam material employed. Throughout the fabrication process of foam insulating liner 200, the ambient temperature of the facility housing the equipment, including the production line itself, may be maintained in a range of about 60° F. to 110° F., and preferably at least 60° F. Once insulating core 202 is fabricated, insulating core 202 may then be disposed in a mold (not shown) having a design embodying the intended product. For purposes of illustration and not to be taken in a limiting sense, the mold described herein embodies a door such that the foam insulating liner produced resembles a door insulating liner. The mold may be lined with a quantity of one or more reinforcing materials and/or one or more additives as described above prior to disposing insulating core 202. A second quantity of one or more reinforcing materials and/or one or more additives may be disposed upon either insulating core 202, the second half of the mold being disposed upon insulating core 202, or both prior to sealing the mold.

The second half of the mold may then be disposed upon the first half. Any method known to one of ordinary skill in the art may then be utilized to seal together the first and second halves of the mold. In a preferred embodiment, a caul plate as known to one of ordinary skill in the art is placed in contact with and on top of the mold so that a downward force is exerted in order to seal together the two halves of the mold.

A quantity of resin material as described above is then disposed within the mold and around insulating core 202 to form resin shell 204. The resin material may be disposed within the sealed mold using any number of methods known to one of ordinary skill in the art such that the resin material fills the entirety of the void surrounding insulating core 202 and wets all of the reinforcing materials contained therein. Preferably, the resin material is vacuum infused at a negative pressure of about 15 inches of Hg into the bagged mold such that the entirety of the void surrounding insulating core 202 is filled and all of the reinforcing materials and additives are wetted. As is understood by one of ordinary skill in the art, a certain amount of time is required to allow the resin material to cure and harden in order to form resin shell 204. The amount of time required may be dependent upon, for example, the resin material(s), curing agent(s), catalyst(s), other materials, operating conditions and/or environmental conditions mentioned earlier. Generally, resin shell 204 may take about 40 minutes to 60 minutes to form dependent upon the resin material employed and amount of catalysts and/or curing agents present in the mixture.

Once resin shell 204 is cured, the mold may be debagged and cracked open to remove the foam insulating liner. Foam insulating liner 200 may then be manufactured further to meet customer specifications for its intended use. For example, foam insulating liner 200 may be utilized as a foam insulated door liner. To achieve this purpose foam insulating liner 200 may be cut or machined to specific dimensions and then framed with any number of materials. For purposes of illustration and not to be taken in a limiting sense, foam insulating liner 200 may be framed with a closeout material such as a pultruded plastic which is sealingly fitted about the perimeter of liner 200. In addition, foam insulating liner 200 may also be coated with one or more coatings described above in order to enhance its appearance (e.g., an aesthetic covering), its durability (e.g., moisture barrier) and the like.

As mentioned earlier, foam insulated liner 200 may be sized and shaped accordingly to meet customer specifications and its intended application. For example, foam insulating liner 200 may comprise a single piece sized and shaped according to customer specifications. In the alternative, foam insulating liner 200 may be cut into pieces such the pieces may be assembled by the customer for his/her intended application. The foam insulated liner pieces may be assembled using any one or a combination of mechanical fasteners including but not limited to dowels, brackets, staples, screws, bolts, nails, rivets, adhesives, sealants, combinations comprising at least one of the foregoing, and the like, as well as bonding agents known to one of ordinary skill in the art. It is contemplated that a kit may be provided such that the kit may comprise one or more foam panels, one or more liners and a pultruded frame comprising one to four pieces. A customer may purchase the kit and assemble the insulated liner or panel him or herself. The insulated liners and panels contemplated herein may be utilized for automotive applications and the like.

The various embodiments and methods of manufacture of the foam insulating liners described herein provide numerous advantages over the prior art. For example, each foam insulated liner and all of their alternative embodiments of the present invention weigh less than present commercially available foam insulated door liners. Present commercially available foam insulated door liners utilize a steel door as their ultimate starting point. Such foam insulated door liners are heavy and bulky due to their weight. Their installation may require at least one or more persons capable of handling heavy weight. Such manual labor and materials issues increase the cost to not only manufacture but to ship the foam insulated steel door as well, which the customer ultimately pays.

The foam insulating liners of the present invention generally weight approximately forty percent (40%) to sixty percent (60%) less than present commercially available foam insulated liners. The foam insulated liners described herein generally weigh about 15 ounces per square foot (0.9375 pounds per square foot) to 48 ounces per square foot (3 pounds per square foot), preferably about 20 ounces per square foot (1.25 pounds per square foot) to 44 ounces per square foot (2.75 pounds per square foot), and most preferably about 23 ounces per square foot (1 pound 7 ounces per square foot). The absence of a steel door, or any other materials for manufacturing doors such as wood, steel, aluminum, alloys, composites and the like, ensure the foam insulating liners described herein are lightweight and incur fewer shipping costs as a result. These cost savings translate to a lower unit price of approximately thirty-three percent (33%) to fifty percent (50%) when compared to present commercially available foam insulating liners.

The foam insulating liners of the present invention also possess improved R values over common insulating materials. A material's R value represents the material's ability to resist the conduction of heat flow through a solid. R values of common insulating materials are shown below:

| Common Insulating Materials | R value |
| --- | --- |
| Styrofoam | 3.3-4.0 per inch |
| Fiberglass | 3.5-4.0 per inch |
| Polyurethane | 6.0-7.0 per inch |

The foam insulating liners of the present invention generally possess R values of no less than about 5 per inch to R value(s) exceeding 100 depending upon various factors such as, but not limited to, the material's thickness, length, width, and composition, for example, polystyrene and polyurethane in the lower range of R values to vacuum insulated materials in the higher range of R values.

Moreover, present foam insulated liners typically comprise two or more sections mechanically bonded together; each section measuring approximately 3½ feet to 4 feet in width each. As a result, a gap forms at the point of contact between each section which can lead to a thermal short circuit. The foam insulated liners of the present invention lessen the formation of and potential for thermal short circuits to occur. When the sections of foam insulated liners described herein are assembled, the pieces are double bonded at the point of contact which will lessen the formation of and potential for thermal short circuits.

Moreover, with respect to the insulated foam panels described herein and their use within railway cars as well as automotive applications, the insulated foam panels may be utilized most advantageously in conjunction with cold rolled steel rather than hot rolled steel. Generally, cold rolled steel is sheet steel which has been rolled to thickness at low temperature in a continuous cold rolling mill operation. Hot rolled steel is sheet steel which has been rolled on a hot-strip mill and its composition includes carbon and other additives. Cold rolled steel is generally manufactured thinner and lighter weight than hot rolled steel. For these reasons, cold rolled steel is a preferred material when constructing railcars and automotive vehicles. Although it is contemplated that the foam insulated panels and liners described herein may be incorporated in many different applications, the combination of the insulated foam panels and cold rolled steel components of railcars and automobiles provide recognizable advantages with respect to cost, R values, weight and the like, over present configurations such as doors constructed of injected foam and heavier, thicker hot rolled steel components equipped with bulky insulating liners.

It is to be understood that the invention is not limited to the illustrations described and shown herein, which are deemed to be merely illustrative of the best modes of carrying out the invention, and which are susceptible to modification of form, size, arrangement of parts, and details of operation. The invention rather is intended to encompass all such modifications which are within its spirit and scope as defined by the claims.

What is claimed is:

1. A method for manufacturing foam insulating liners, comprising: providing a mold having a first half and a second half;

applying a quantity of non-adhering material in an amount sufficient to prevent a resin material from sticking to an interior surface of each of said first half and said second half;

placing a first side of a pre-formed insulating liner frame in said first half of a said mold;

placing a second side of said pre-formed insulating liner frame in said second half of said mold;

sealing together said first half and said second half of said mold and forming a void between said first and second sides of said pre-formed insulating liner frame;

forming a foam insulating core between said first and second sides by disposing a quantity of foam material into said void between said first side and said second side of said insulating liner frame within said sealed mold;

removing a foam insulating liner consisting of said foam insulating core positioned between said first and second sides from said mold;

fitting a frame about a perimeter and sides of said foam insulating liner; and wherein disposing said quantity of foam material comprises vacuum infusing said quantity of foam material.

2. The method of claim 1, further comprising applying a coating selected from the group consisting of anti-abrasive, appearance covering, blackbody, breather, mastic, moisture barrier, and weather barrier, to an exterior of said foam insulating liner.

3. The method of claim 1, wherein said frame comprises a pultruded plastic frame having a tapered edge.

4. The method of claim 1, wherein said insulating liner frame comprises a resin material, one or more reinforcing materials, and one or more additives.

5. The method of claim 4, wherein said resin material is selected from the group consisting of urethanes, polystyrenes, polyesters, and epoxies.

6. The method of claim 4, wherein said reinforcing materials are selected from the group consisting of ceramic fibers, fibrous glass, glass cloth, glass fabric, glass fiber, calcium silicate, diatomaceous earth, expanded vermiculite, cellulose fibers, woven fabric, non-woven fabric, compacted powder, compacted fiber, mineral fiber, mineral wool, perlite, refractory materials, wood fibers, and poly-paraphenylene terephthalamide fibers.

7. The method of claim 4, wherein said additives are selected from the group consisting of abrasion resistant materials, sweat resistant materials, chemical resistant materials, blackbody materials, fire resistant materials, fire retardant materials, intumescent materials, water vapor retardant materials, mold resistant materials, mildew resistant materials, solvent resistant materials, caustic resistant materials, freeze-thaw resistant materials, and water resistant materials.

8. The method of claim 1, wherein said foam material is selected from the group consisting of cellular elastomeric foam, cellular glass foam, cellular polystyrene, cellular polyurethane, cellulosic fiber, aldehyde condensed phenols, polyethylene, polyisocyanurate, polyolefin, polyvinyl chloride, polyvinyl fluoride, polyvinyl, and vinyl.

9. The method of claim 1, wherein said foam material is froth foam.

10. The method of claim 1, wherein placing said first side of said insulating liner frame comprises placing a first side of an insulating liner frame comprising a resin material, one or more reinforcing materials and one or more additives in said first half of said mold.

11. The method of claim 1, wherein said placing said second side of said insulating liner frame comprises placing a second side of an insulating liner frame comprising a film cover material in said second half of said mold.

12. The method of claim 1, further comprising allowing the foam material to develop a pressure in the range of from about 1.0 to 10 pounds per square inch (absolute) while said foam material is within said mold.

13. The method of claim 1, further comprising allowing the foam material to develop a pressure in the range of from 3.0 to 7.0 pounds per square inch (absolute) while said foam material is within said mold.

14. The method of claim 1, further comprising allowing the foam material to set and harden for a time period in the range of from about 40 to 60 minutes.

15. The method of claim 1, further comprising manufacturing said foam insulating liner into a door liner for a door of a railcar.

* * * * *